(12) United States Patent
Gupta et al.

(10) Patent No.: US 8,806,154 B1
(45) Date of Patent: Aug. 12, 2014

(54) THIN PROVISIONING ROW SNAPSHOT WITH REFERENCE COUNT MAP

(75) Inventors: Atul Gupta, Bangalore (IN); Umashankar Tumari Mahabalagiri, Shimoga (IN); Vishnu Rangayyan, Sunnyvale, CA (US)

(73) Assignee: Chelsio Communications, Inc., Sunnyvale, CA (US)

( * ) Notice: Subject to any disclaimer, the term of this patent is extended or adjusted under 35 U.S.C. 154(b) by 469 days.

(21) Appl. No.: 13/168,886

(22) Filed: Jun. 24, 2011

Related U.S. Application Data

(60) Provisional application No. 61/483,378, filed on May 6, 2011.

(51) Int. Cl.
   *G06F 12/00* (2006.01)
(52) U.S. Cl.
   USPC ............ 711/156; 711/165; 711/170; 711/171

(58) Field of Classification Search
   USPC .................. 711/156, 165, 170–171
   See application file for complete search history.

(56) References Cited

U.S. PATENT DOCUMENTS

| | | |
|---|---|---|
| 5,873,078 A | 2/1999 | Angle et al. |
| 5,963,962 A | 10/1999 | Hitz et al. |
| 2004/0230766 A1 | 11/2004 | Cameron |
| 2007/0271431 A1 | 11/2007 | Hwang et al. |
| 2011/0191536 A1* | 8/2011 | Mizuno et al. ............... 711/114 |

* cited by examiner

*Primary Examiner* — Jasmine Song
(74) *Attorney, Agent, or Firm* — Beyer Law Group LLP

(57) ABSTRACT

The storage of single or multiple references of the same data block in a storage pool is disclosed. Indexing of the data includes storing reference information in the storage pool as a mapping table. The mapping table indexes each data block in the storage pool. On any read or write request mapping information is used to retrieve the corresponding data block in storage pool.

34 Claims, 9 Drawing Sheets

THIN PROVISIONING ROW SNAPSHOT WITH REFERENCE COUNT MAP

CROSS-REFERENCE TO RELATED APPLICATIONS

This application claims the benefit of priority under 35 USC 119(e) to U.S. Provisional Application No. 61/483,378, filed on May 6, 2011, which is incorporated herein by reference in its entirety for all purposes.

FIELD OF THE INVENTION

The present invention pertains generally to indexing of data chunks in a storage pool. In particular, the present invention is directed to generating, storing, and later utilizing indexing information and a usage count of storage chunks for point in time snapshots taken for virtual volumes of a storage pool.

BACKGROUND OF THE INVENTION

It is common in many computing systems to generate backups, including periodic snapshots, which are point-in-time copies of data. A storage device typically must support backup of data onto a safe and stable storage device by making multiple copies of data so that loss of any copy is not catastrophic. These additional copies may be used to restore the original data after a data loss event.

To further strengthen the safety of data backed up it is often required that clones of stored data also be created. The clone thus created at various time intervals occupies the same amount of space on storage device as the original (origin) data source at that point of time. However, if many snapshots are taken then the total amount of storage associated with the clones and the snapshots can become prohibitive and lead to duplicate copies of information that doesn't frequently change, which is wasteful of storage space. To minimize the storage space and prevent un-necessary copying of data it is advisable to share data between a primary data source and its several clones. Rather than creating a complete copy of an entire disk containing the source data, disk area may be divided into a smaller addressable storage space called a 'chunk'. Thus, on clone creation it is the chunks which are copied rather than the entire disk.

To further save on storage space the chunks may be referred to by the parent and the clones are not copied but are shared.

However, conventional techniques to manage clones and snapshots have many drawbacks. As an example, in the write anywhere file-system layout of U.S. Pat. No. 5,963,962, the data sharing information is stored in a bitmap, the length of which limits the number of snapshots created. There are also other disadvantages of prior art storage solutions to index and manage clones and snapshots.

The present invention provides an alternative indexing and storage management approach which has advantages over the prior art for managing clones and snapshots such as increased scalability and eliminating the bitmap requirement of the prior art.

SUMMARY OF THE INVENTION

A storage server is disclosed that supports thin provisioning of a storage volume and also supports Redirect-On-Write (ROW) snapshots. A reference count map is used to index a storage pool. Data is stored in chunks in the storage pool and a mapping table indexes each data block in the storage pool. The metadata data for the mapping table may be stored in reference chunks. On any read or write request mapping information is used to retrieve the corresponding data block in storage pool. The storage server may be implemented as a Unified Storage Server having interfaces to support both file-based access and block-based access.

An exemplary method provides scalable indexing of a storage pool from multiple storage units. A virtual volume is formed in which the combined storage capacity of the storage pool is represented by a set of chunks having a pre-selected data size. The chunks are assigned to be either storage chunks or reference chunks. Metadata information is stored in the set of reference chunks to index the storage chunks and track usage of the storage chunks. The storage chunks are allocatable on demand and are referable more than once to reduce redundant storage for identical content. The total number of chunks and a chunk allocation may be adjusted in response to a change in the size of the available physical storage to include a sufficient number of reference chunks to index all of the storage chunks. In one implementation the reference chunks are updatable to store indexing information for Redirect-On-Write snapshots of the virtual volume.

DETAILED DESCRIPTION

I. Apparatus and System Overview

This present invention pertains generally to a storage server having several improved storage application aspects, including indexing of data chunks in a storage pool, including storing a usage count of storage chunks, when point in time snapshots are taken for the virtual volumes.

Thin provisioning is one such storage application which utilizes the present invention. Thin provisioning is a storage virtualization method to efficiently utilize the storage space. In conventional storage, storage space is allocated beyond current needs in anticipation of growing storage usage thus paying for the overcommitted storage which is never used. But in thin provisioning storage an individual managing the storage server can purchase less storage capacity upfront and defer storage capacity upgrades in line with actual business usage and save the operating costs associated with keeping unused disk capacity spinning at lower administrator efforts. Thin provisioning enables over-allocation or over-subscription. Over-allocation is a mechanism that allows server applications to be allocated more potential storage capacity than has been physically reserved on the storage array itself. This allows flexibility in growth and shrinkage of the physical application storage volume, without having to predict how much a volume will grow or shrink. For example, each user of a system can be allocated some theoretical storage limit, such as 10 GB. Physical space on the storage array is dedicated only when data is actually written by the storage application and not when the storage volume is initially allocated.

Figure 1:
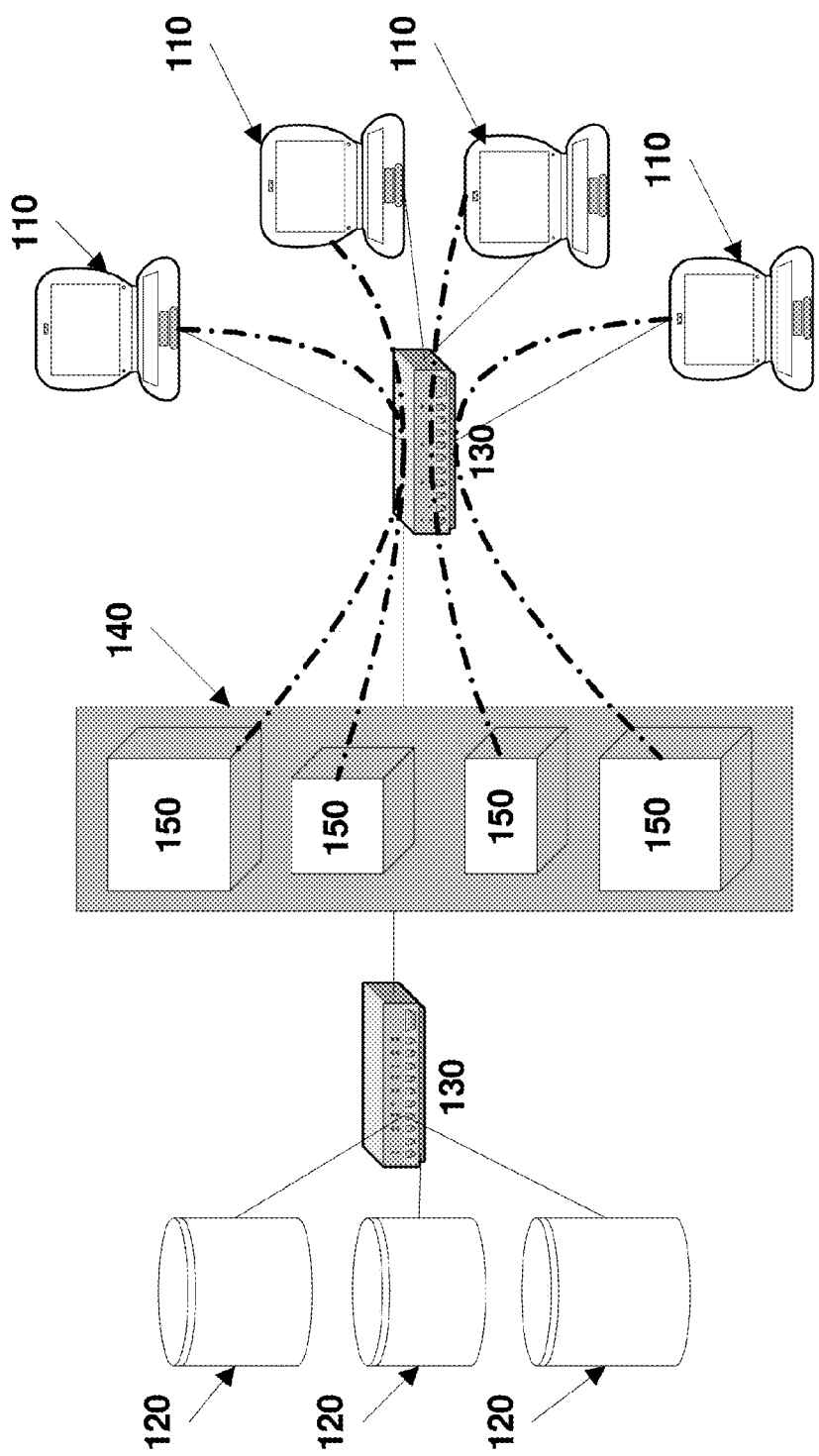
FIG. 1 illustrates an exemplary storage server system in according with an embodiment of the present invention.
Figure 1A:
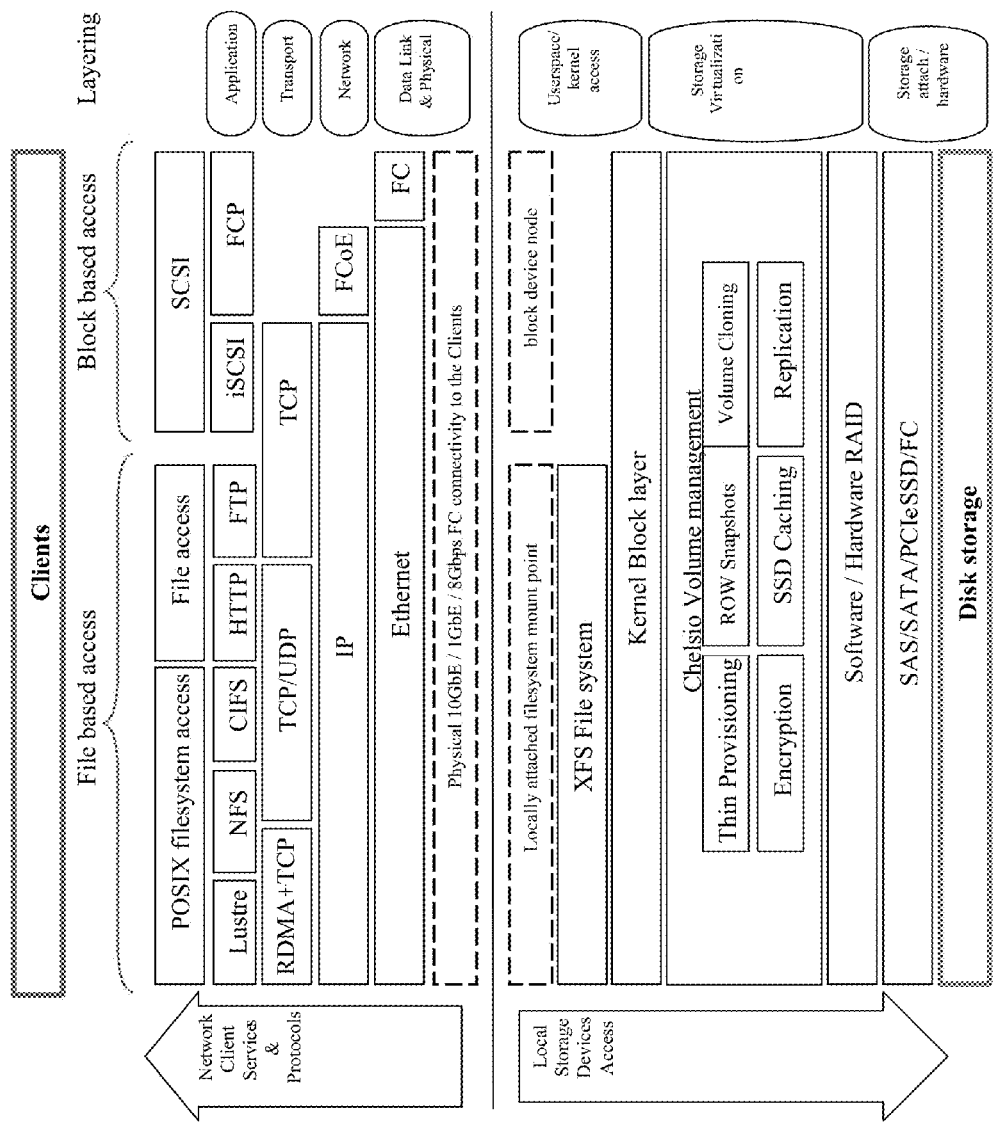
FIG. 1A illustrates an exemplary application of thin provisioning in a Unified Storage Server (USS) in accordance with one embodiment of the present invention.

FIGS. 1 and 1A illustrate aspects of an exemplary storage server environment of the present invention. It will be understood throughout the following discussion that a system, apparatus, and method are contemplated, along with a computer readable medium to store machine readable code to implement exemplary methods. In particular, the storage server includes a local processor or processors and has associated with it a memory for storing computer program code. Additional cache memory may be provided for the storage server. The storage server also has access to any metadata information it stores in the storage pool or in a dedicated storage unit.

Thin provisioning allows for creating virtual volumes that are greater than the total size of physical devices present. This allows for pre-allocating large amounts of potential capacity for different end-users, and then populating the real devices as the actual usage by the end-users increases. Physical devices can be dynamically added to the storage pool to provide required disk space, while volumes in the pool are being accessed. The pool will stop all volumes and not allow further I/O, once it runs out of space. The manager of the system can then add physical devices and reactivate all volumes and resume all I/O.

Referring to FIG. 1, a storage server computer 140 includes computer hardware such as at least one processor and a local memory to store computer program code for implementing thin provisioning. In one embodiment the storage server 140 also includes at least one ASIC (not shown) such as a processor designed for storage server applications and/or having additional hardware specific to storage server applications. The storage server 140 receives and responds to read and write requests from one or more client computers 110. Elements 120 are illustrated as being an array of hard disk drives forming the physical storage units for a storage pool, although it will be understood that elements 120 may comprise other types of storage units suitable for storing backup information.

The storage pool 150 is a virtual volume exposed by storage server computer 140 to client computers 110. Interfaces are provided to communicatively couple the storage server 140 to client computers and to the storage elements 120. In one implementation, storage server computer 140 includes one or more network ports connected to a network switch 130 on one side with other suitable switch(es) to connect to storage devices on the other side. Client computers 110, also referred to as initiators, may utilizes various advanced interface features such as Internet small computer systems (iSCSI), Fibre channel over Ethernet (FCoE), Network File system (NFS) etc provided by 140 to access the storage disk 120.

Referring to FIG. 1A, in one embodiment a storage server 140 may be implemented as a highly scalable Unified Storage Server (USS). FIG. 1A is a functional block diagram but it would be understood that the physical implementation for the storage server, includes at least one processor and a local memory storing computer program code to implement the functional blocks, with the function being implemented using, for example, a combination of special purpose hardware and software executing on one or more processors. A USS provides interfaces and other features to support storage using different interface protocols such as iSCSI and FCoE. In an exemplary USS implementation both file based access and block based access is supported through a suite of network client services and protocols, with an exemplary set of common industry-standard protocols and services illustrated along with their corresponding layer in a conventional network model (e.g., application, transport, network, data link, and physical layers). An exemplary implementation supports 10 GbE connectivity as well as other data rates. The USS may use standard user space kernel access, such as an XFS file system for file based block access and a block device node for block based access. The virtualization of storage is performed at a volume management layer, which includes thin provisioning.

Additionally, other features to support volume management may be included, including volume cloning (e.g., cloning of an original volume), replication, Read-on-Write snapshots, SSD caching, and encryption. The volume management layer may leverage off of an industry standard platform, such as a Linux® platform, i.e., be Linux® compatible but have features and functions not found in conventional Linux®. Other features to support fault tolerant attachments to different physical disk storage units may be included, with exemplary examples such as software/hardware Redundant Array of Independent Disks (RAID), and standard interfaces such as Serial ATA (SATA), Serial Attached SCSI (SAS), Peripheral Component Interface Express (PCIe), and Solid State Drive Fibre Channel (SSD)/FC.

The present invention includes an improved thin provisioning function and additional support features which may be implemented in a storage server or in a USS, although it will be understood that other implementations are also contemplated as being within the scope of the invention.

In a data storage system, a snapshot of a volume is generally taken to store the point in time copy of data. The point in time copy allows the users to roll back to any previous state of volume in the past. There are several types of snapshot mechanisms: Copy-on-Write, Redirect-on-write, Clone or Split-Mirror, Copy-on-write with background copy, Incremental and Continuous data protection. In any of the above approaches a snapshot creates a logical copy of disk partitions.

An exemplary embodiment of the present invention supports snapshot operations using a Re-direct-on Write (ROW) although more generally other snapshot mechanisms may be used. Redirect-on-Write (ROW) is a method of protecting data that needs to be overwritten by new writes after a snapshot has been taken. It preserves the old data in its old location, and instead, redirects the new write to a new location. All subsequent reads and writes of data for the volume are performed at the new location. Snapshot reads continue to be performed from the old location.

In one embodiment, the thin provisioning of the present invention may be implemented to provide a suite of features comparable to conventional volume management, such as Linux Logical Volume Management (LVM), but optimized for performance and supporting other features such as allowing over provisioning of volumes, i.e., thin provisioning, where the physical storage capacity is added only on demand, but advertised upfront. Additionally, conventional LVM supports Copy-on-Write (COW).

In one implementation thin provisioning supports taking Redirect-On-Write (ROW) snapshots, which have a lower number of I/O operations. In particular, one benefit of ROW is that it requires two I/O operations on record updates instead of three I/Os for Copy on Write. That is, ROW is more efficient than COW.

In one embodiment thin provisioning also supports cloning a volume instantly, an instant restore of a volume from a snapshot. A device mapper encryption driver can also be used with a thin provisioned volume, to encrypt data being stored in that volume. ROW creates a point in time view (snapshot) of the original volume wherein a snapshot volume shares all the data blocks created by the origin until any update or write happens. Any update/new write to original or snapshot volume may allocate a new block with unique pointer not referred by previously created snapshot and origin.

Thin provisioning, in a shared storage environment, supports the allocation of data blocks as data is written real-time. This methodology eliminates almost all whitespace which helps avoid the poor utilization rates that occur in the traditional storage allocation method where large pools of storage capacity are allocated to individual servers but remain unused.

II. Indexing and Management of Storage Data

Figure 2:
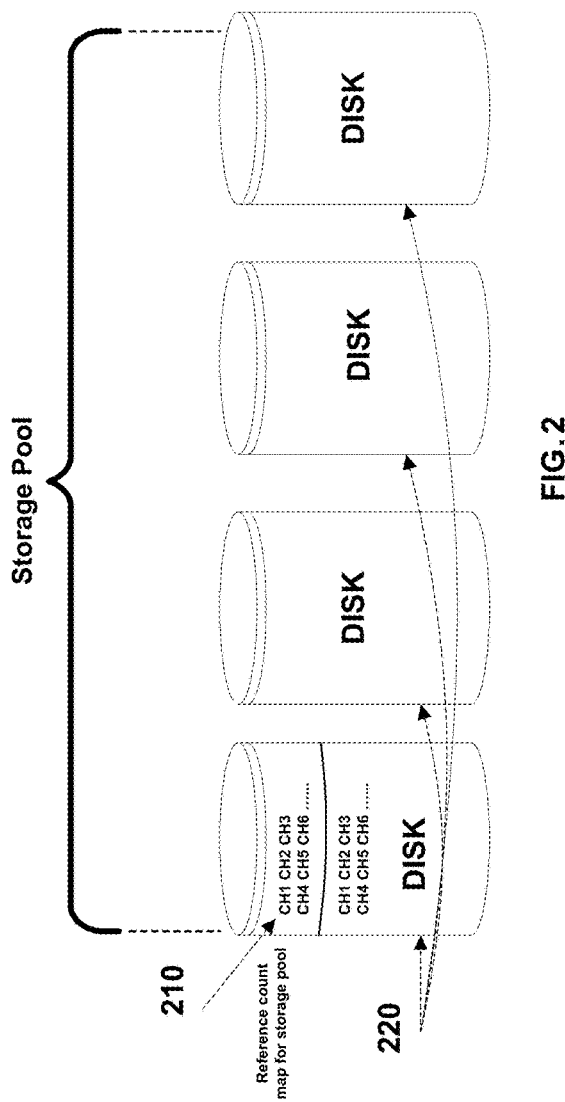
FIG. 2 is a block diagram of a storage pool in accordance with one embodiment of the present invention.

Referring to FIG. 2, the storage pool comprises all of the available storage, which may include the combined capacity of different storage units. The volume within a storage pool is divided into chunks, where the chunks preferably have the same size, such as an efficient minimum size for addressing. The chunks may further be allocated as storage chunks or as reference chunks storing reference data, i.e., metadata.

Each volume within a storage pool requires indexing to map the storage chunks allocated to that volume. An exemplary chunk size is 32 KB. When a chunk is allocated to store metadata this permits a single chunk to be allocated a large number of slots for metadata (e.g., 4096 slots for a chunk size of 32 KB in one implementation). Volume metadata, such as a radix tree and other information, is allocated to a set of chunks used to store metadata for indexing. Both the original volume and its snapshots can share the same radix tree. The metadata may also be dynamically allocated.

In one embodiment the first few chunks of the storage pool are used to maintain a reference count mapping and are known as reference count chunks. As illustrated, chunks CH1, CH2 etc are the chunk numbers in sequence as they appear in the disk. For example, element 210 is a reference count chunk. In one implementation a reference count chunk stores a table indexed by storage pool chunk number to identify the storage chunks indexed by the reference count chunk. A fixed space in a reference count chunk may also be assigned to store a usage count of each addressed storage pool that is called a 'bitset' 220. The bitset is used to store the usage count of a corresponding chunk on the disk, i.e., whether the chunk is used at all or is referenced more than once, which may occur in the case of data referred to by a clone and by snapshots. The length of the bitset may be varied from application to application to permit the usage count to be optimized for a particular application. It will be understood, however, that other alternate approaches to store the bitset information may be employed other than storing it within a reference count chunk.

The reference count mapping includes the full set of reference count chunks and associated bitsets required to index the storage volume. In many applications the performance may be acceptable if this information is accessed solely from the storage pool. However, to improve the ability to read and utilize indexing information the reference count chunk 210 and the bitset 220 may alternatively be stored on, for example, a dedicated storage unit (e.g., a disk storage) for better performance and used to reference other storage chunks in the storage pool. Additionally, caching may also be employed to improve the indexing performance when performing a read/write operation on the storage server.

As illustrated in FIG. 2, there may be multiple disks for storage. The thin provisioned storage pool is implemented by dividing the actual storage disk space—which may be from more than one individual storage system—into chunks and logically addressing each chunk using a chunk mapping mechanism, what is called here the reference count map and associated bitset. The chunks preferably have the same size to facilitate addressing, data access, and indexing.

Figure 3:
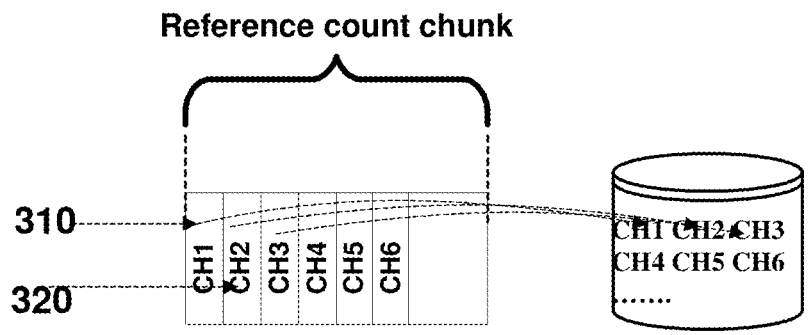
FIG. 3 illustrates the reference count chunk addressing the chunks on the disk in accordance with one embodiment of the present invention.

The chunks are allocated on demand. FIG. 3 illustrates in more detail aspects of a set of multiple reference count chunks CH1, CH2, CH3, etc. for addressing of chunks on physical memory (e.g., one of a set of disk drive storage units). There is a whole positive number "m" of reference count chunks for addressing the entire storage pool with each reference count chunk storing the usage count of a number "n" of chunks. As previously described, a set of initial chunks may be used to maintain the reference count mapping and a logical addressing scheme may be used to address the chunks. Element '310' is a reference count chunk while element '320' is a bitset portion which is used to store the usage count of corresponding chunks on the disk, i.e., to store information whether the chunk is in use or free to be allocated. The length of the bitset may be varied from application to application.

A radix tree may be used to index the storage chunks, where each node in the tree contains a number of slots. Each of these slots in turn contains a disk address of either the data item if it is a leaf node, or a next level tree node. The number of slots per node is dependent on the chunk size. A chunk size of 32 KB can have 4096 such slots. A portion of the logical address of the data chunk is used as the key for these slots. In this implementation the logical address is split into multiple keys each with n bits, where n is calculated from the chunk size i.e., a chunk size that is 32K requires 12 bits to address all the 4096 slots. That means, the first 12 Most Significant Bits (MSBs) of a logical address may be used as key for a root level node with the next 12 bits being for the second level, and so on to support a radix tree mapping from a logical address to disk addresses.

The reference count mapping approach is scalable and thus effectively allows the user to create unlimited snapshots and ensures that originals and snapshots share as many common pages as possible. Scalability is enhanced by using a sequential ordering system where the chunks have a sequence and the addition of a new storage unit results in an addition of new chunks in the sequence. The reference count is incremented and decremented as the volumes or snapshots are created and removed in the pool.

In a typical application the reference count chunks of the reference count map would be located at either end of the storage pool due to the benefits of having the indexing information in a contiguous region of memory. However, more generally, the reference count pool may be implemented in any region of contiguous memory with each storage pool chunk referred by a set of bits (depending on number of snapshots required for a volume) of memory space. For example, the reference count pool may be located in a contiguous region of memory at either the beginning or the end of the storage pool. The reference count pool maintains the reference count of each chunk which is incremented and decremented as and when chunk is allocated and referred by origin and snapshot volume. The reference count of a free block is zero.

The reference count pool serves the purpose of providing both bitmap and block references but is more efficient, flexible, and scalable than prior art approaches. If higher performance is desired, the reference count pool may sit on a separate disk and as a result access is faster and does not require any locking on data chunks when reference count calculation is in progress. A cache for reference count chunks may also be provided for a performance improvement.

Figure 4:
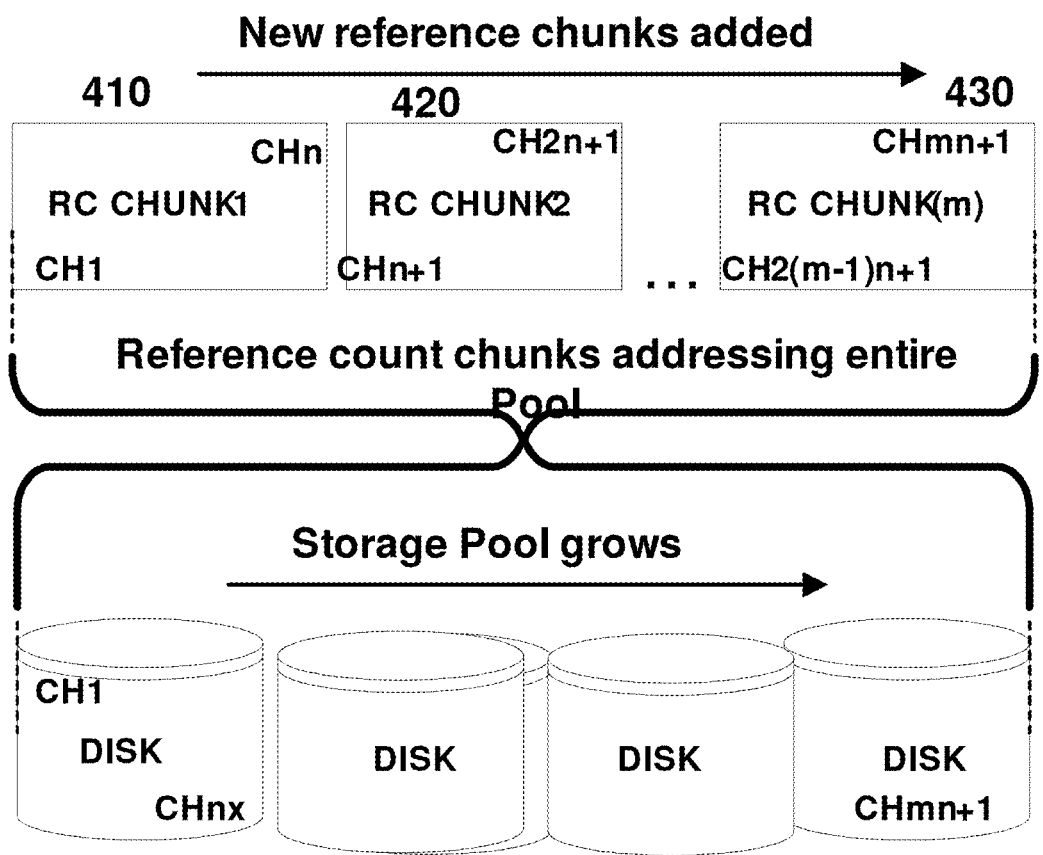
FIG. 4 illustrates that multiple reference count chunks are used to address multiple disks in a storage pool in accordance with one embodiment of the present invention.

FIG. 4 illustrates how the reference counting may be adjusted as the storage pool is increased. FIG. 4 illustrates 'm' reference count chunks addressing the entire storage pool (e.g., a set of disk drive memories) with each reference count chunk storing the usage count of 'n' chunks. As the storage pool grows, such as by adding an additional disk drive, new reference chunks are added so that the reference count chunks address the entire pool. Of course, it will be understood that a converse process may also occur, such as if for example the storage pool was temporarily decreased in size for some reason, such as the crash of disk drive storage units due to a natural disaster.

Figure 5:
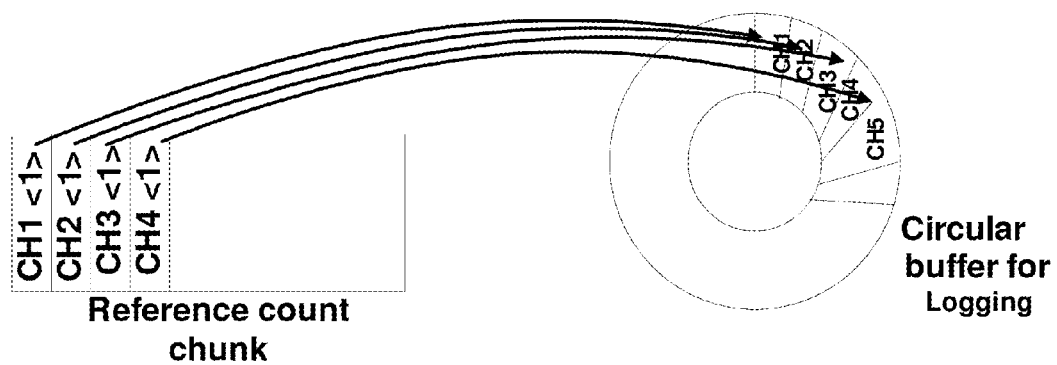
FIG. 5 illustrates a circular buffer in accordance with one embodiment of the present invention.

As illustrated in FIG. 5, in one implementation a circular buffer maintains a free list of storage chunks. In this implementation, the circular buffer is used for logging of reference count chunks. The bitset reference count chunk 320 is also stored in the circular buffer; the circular buffer maintains a free list of storage pool chunks. The circular buffer with unused chunk addresses is logged onto the persistent storage and is played again when the storage application is re-initialized.

Figure 6:
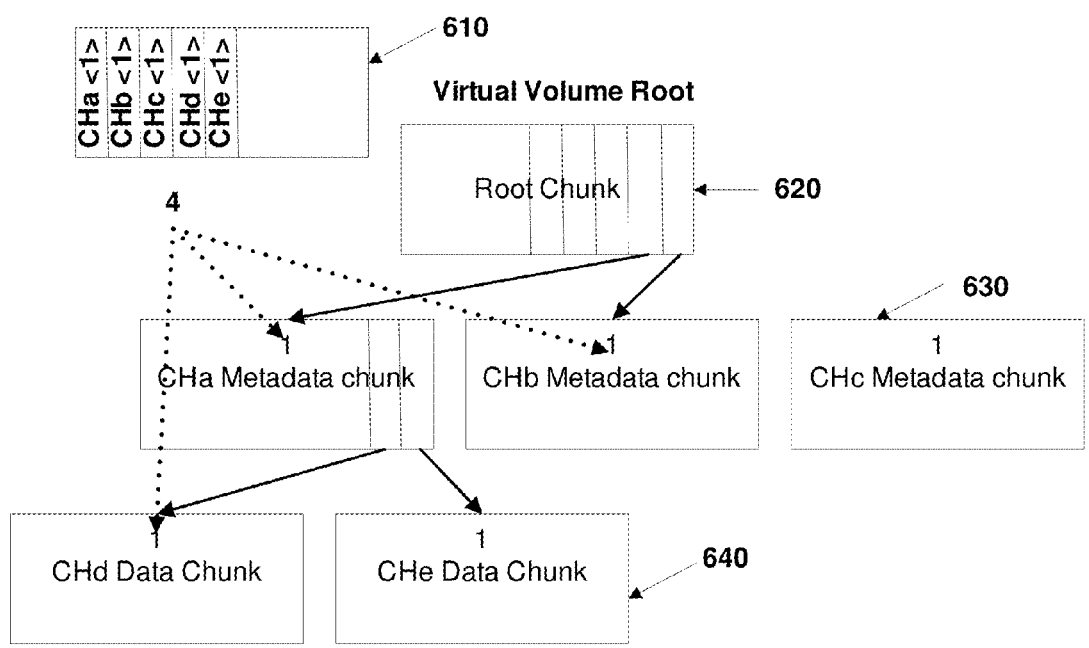
FIG. 6 illustrates a virtual volume tree in accordance with one embodiment of the present invention.

As previously discussed, the storage pool is implemented by dividing the actual storage disk space into chunks and addressing each chunk using the mapping mechanism which could be implemented by a radix tree or B-tree as an example. Radix tree referencing is described U.S. Pat. No. 5,873,078, the contents of which are hereby incorporated by reference. An exemplary tree mapping is illustrated in FIG. 6. The lowest level of the tree contains the leaf nodes or data chunks referred by 640 in FIG. 6. Data chunks are searched or inserted using a tree traversal procedure supported by the mapping mechanism. The height of the tree is determined by the number of bits in the keys. The larger the number of bits the smaller is the height but the tradeoff involves comparing more bits on each search to reach the leaf node.

FIG. 6 depicts a virtual volume radix tree with a root, metadata, and data chunk. In particular, a root node 620 points to metadata chunks 630 and the metadata chunks in turn points to data chunks 640. The usage count is also illustrated as Element '4' in FIG. 6 to illustrate the usage count of each chunk in the storage pool. The root node 620 has children that are metadata chunks and metadata chunks points to data chunks. The depth of the tree depends on the size of the storage pool and the chunk size. Element '610' is the reference count chunk and the value inside the braces is a usage count of each referenced storage pool chunk. In one embodiment when a new chunk is allocated from the storage pool for any new write to disk the usage count of that chunk is marked as one.

In the example of FIG. 6 several of the illustrated chunks, including a metadata chunk 630 or a data chunk 640, has a usage count of one as they are owned by only one virtual volume. Element 610 in FIG. 6 is one such reference count chunk which stores the usage count of both virtual volume and snapshot chunks. In this example all the chunks referred to by 610 have the usage count of 1. The chunks referred by to both the original volume and the snapshot volume need not be duplicated but have their usage count incremented by one on any new reference; hence saving the space occupied in storage pool. The chunk is duplicated only when a shared chunk is written to by any of the sharing volumes. When the snapshot of a volume is taken the chunks owned by a volume are shared with the snapshot, thus increasing the usage count of each shared storage chunk to 2.

Figure 7:
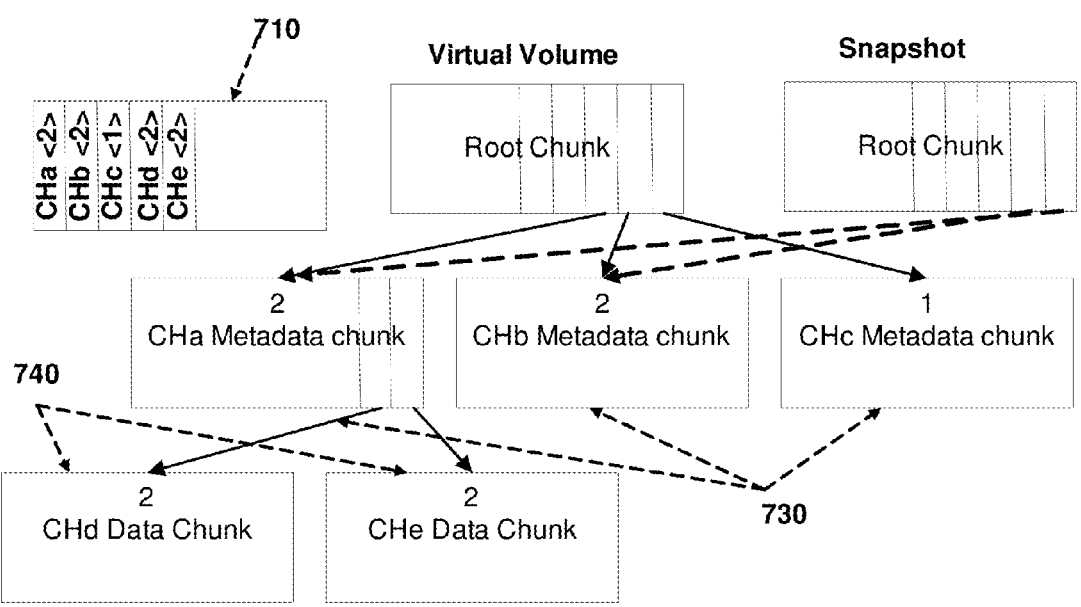
FIG. 7 illustrates a virtual volume and its snapshot sharing the chunks in accordance with one embodiment of the present invention.

FIG. 7 illustrates a virtual volume and its snapshot sharing chunks, such that in this example the usage count of some chunks is more than one. Metadata chunks 730 CHa and CHb are illustrated in FIG. 7 along with their child nodes. Usage counts are also superimposed. In FIG. 7 the metadata chunk 730 CHc owned by virtual volume alone has a reference count of 1. Data chunk 740 is shared by both the virtual volume and the snapshot hence its usage count is incremented to 2. Comparing the examples of FIGS. 6 and 7, the reference count chunk 710 in comparison to reference count 610 has the usage count of shared chunks incremented by 1. That is, any new snapshot of a volume will further increase the reference count of a chunk by one saving on the space required for chunk duplication.

III. Snapshot Scalability

Note that the usage count stored in reference count chunk 610 or 710 allows the chunks to be referenced by any number of volumes. This eliminates redundant storage, improving storage efficiency. This is particularly important for applications in which there is a potentially large number of snapshots. Referring back to FIG. 2, the usage count for all the storage pool chunks is stored at one location as a group at the beginning of the storage pool and is referred to as 'reference count map'. Element 210 in FIG. 2 is the reference count map and occupies few chunks of the storage pool. The reference count map addresses all the chunks of the storage pool and maintains the storage pool chunk usage count. Element 210 illustrates an example of a reference count chunk addressing the storage pool chunks CH1 to CH6 in the sequential order as they appear on storage pool i.e. information in the reference count chunk is a table indexed by storage pool chunk number. The usage count of each addressed storage pool chunk occupies a fixed space in reference count chunk and is the 'bitse' 220. Each reference count chunk maintains the 'bitset' of fixed number of storage pool chunks. Each reference count chunk has a fixed size hence can address a fixed number of storage pool chunks. For example, in FIG. 4, reference count chunks 410, 420 both address same number of storage pool chunks. The reference count map is thus a pool of several reference count chunks and the number of reference count chunks 410,420 and 430 in the map grows as the size of the storage pool grows. In this example, reference count chunk 410 maintains the usage count of the first 'n' storage pool chunks, reference count 420 maintains the usage count of the next 'n' storage pool chunks and so on till reference count chunk 430 maintain the usage count of last few storage pool chunks.

Figure 8:
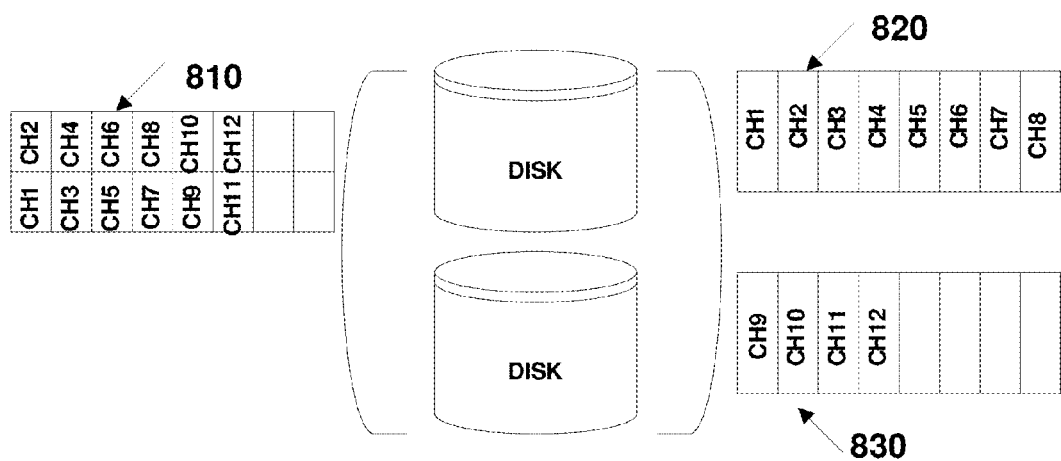
FIG. 8 illustrates a bitset required to store a snapshot usage count in accordance with one embodiment of the present invention.

FIG. 8 illustrates aspects of the bitset required to store a snapshot usage count. The maximum number of virtual volume snapshots is determined, in part, by the size of the bitset. However, the bitset also consumes storage space so there is a tradeoff between having a smaller bitset (which reduces metadata storage requirements in an individual reference count chunk) and being able to support a high usage count (which is beneficial to support multiple snapshots referencing common data chunks). Assuming that bitset information is stored in a reference chunk with a fixed amount of space allocated for the total bitset, there are various tradeoffs. The higher the bitset value the larger the usage count of the storage pool chunks but this means that there will be a smaller number of storage pool chunks addressable by one reference count chunk. There is thus a tradeoff in terms of the amount of metadata storage required for the bitset and the number of snapshots that can refer to a common data chunk. This tradeoff can be optimized for a particular application. In other words, the reference count map size depends on the bitset size, which can be tailored for a particular application based in part by considering the potential need to scale the storage system. In the example of FIG. 8, the bitset of 810 is half as that of the bitset of 820 and 830 and as a consequence in example 810 it can maintain the usage count of the same number of storage pool chunks as can examples 820 and 830 together. Against the advantage of half the space required for the smaller bitset of 810 reference count map, it can only allow half the numbers of snapshots as can the larger bitset. As previously described, the bitset for any chunk is marked as one when the chunk is allocated with its address stored in the circular buffer. The bitset is marked as zero when a chunk has no references. A chunk with a bitset set to zero is free for allocation again.

Referring back to FIGS. 4-5, in these examples the chunk allocation is expedited by maintaining a circular buffer of free chunks with usage count set to one in the bitset. The circular buffer has threshold limit set which when hit, triggers the further chunk allocation keeping the circular buffer abreast with the write operations on the pool. The circular buffer is written onto stable storage at a periodic interval for journaling purposes and is replayed when the chunk allocation is requested again on application initialization. For the situation of recovering from loss of the in-memory copy after being modified and after being written to stable storage, this step helps to maintain metadata sanity and thus aids in maintaining file system integrity. As discussed above in one implementation the storage pool chunk allocation proceeds in a sequential order starting with checking of the first reference count chunk 410 for free bitset followed by the next reference count chunk 420 and so on until a scan is performed for reference count chunk 430 scanning for a free bitset. Chunk allocation logic may then wrap around starting at 410 again looking for any free bitset. The deletion of virtual volumes and clones frees all the chunks owned exclusively by them, the bitset of all such chunks is marked a zero in the reference count map.

Referring to FIG. 7, if multiple virtual volumes and clones are performing Input/Output operations simultaneously on the storage pool then the chunks assigned to for data access may be determined by the order of chunk allocation. At any point of time a reference count chunk 710 can contain the addresses of chunks allocated to multiple virtual volumes and their clones. Thus, same reference count chunk 710 can thus be in use by multiple virtual volumes or clones to update the usage count of storage pool chunks addressed by the same reference count chunk.

Figure 9:
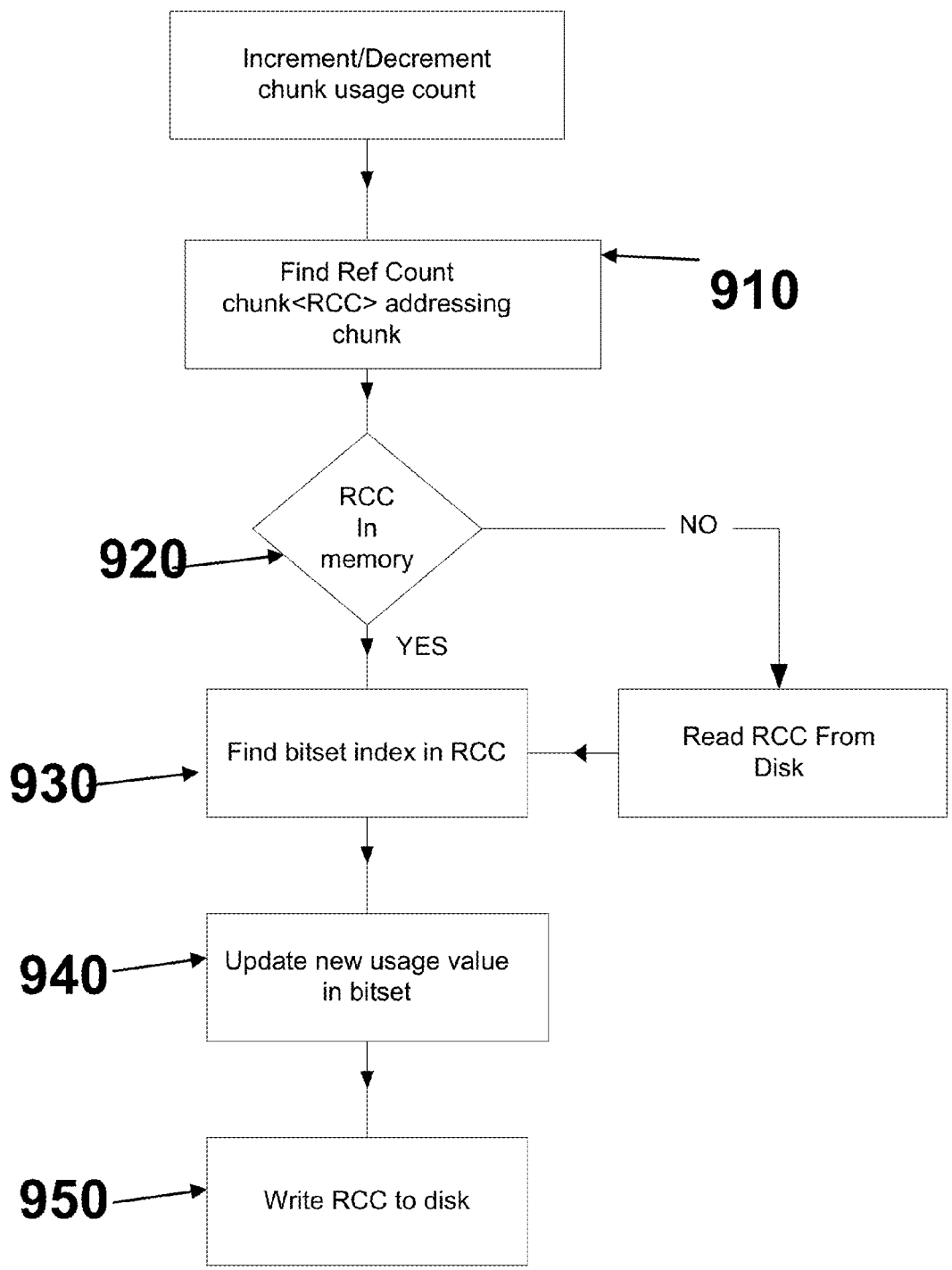
FIG. 9 is a flow chart illustrating steps for usage count updates in reference count chunk (RCC) in accordance with one embodiment of the present invention.

FIG. 9 is a flowchart of an exemplary method of updating the usage count of storage pool chunks which starts with allocating the reference count chunks and marking the bitset value to 1 as the circular buffer for the freely available chunks is created. When the reference count of any chunk is increased on snapshot creation or deleted on volume/snapshot deletion, the reference count chunk which owns the data chunk in step 910 is searched. In one embodiment the reference count chunk address on disk is arrived on after dividing the data chunk number by the total number of data chunks addressed by single reference count chunk, the quotient returns the reference count chunk address while the remainder returns the data chunk offset in reference count chunk. In step 920 if reference count chunk is not present in memory then it is read from disk. In step 930, search the reference count chunk for the index corresponding to the storage pool chunk for which usage count need to be modified. In step 940 the bitset corresponding to the index above in RCC is modified with new usage count i.e. an increment or decrement of the bitset with a new value. Finally updated reference count chunk is written to stable storage. The bitset is marked 0 if the chunk is no longer in use and is used later.

III. Metadata and Logging String

Metadata consistency may be ensured by logging the reference count changes. In one implementation, any increment or decrement to the reference count value is encapsulated in a logging string. The logging string comprises an address of reference count chunk, a word offset in the chunk, a bitset offset in a word, a previous reference count value and a new reference count of an addressed storage pool chunk. For example, Cha in FIG. 6 has a original reference count of 1 which increases to 2 on snapshot creation. Now consider CHa in FIG. 7 that has both the old and the new value which is logged in a logging string along with chunk address CHa.

A logging string is grouped in logging chunks and is written to persistent storage by a periodic timer along with metadata information. In one implementation the logging string is marked dirty and is available for replay as long as metadata addressed by it is stored in volatile memory. Once the metadata is successfully written to persistent disk logging information it may be marked void and is rendered useless. Logging information helps maintain the metadata consistency. A dirty log when played on system recovery ensures that reference count value of a chunk matches the number of volumes using it. If a failure occurs while committing the metadata chunk CHe in FIG. 7 to disk for which the reference count is changed then old reference count value, i.e. 1, is stored for that chunk in reference count map 710, else a new value is retained.

Figure 10:
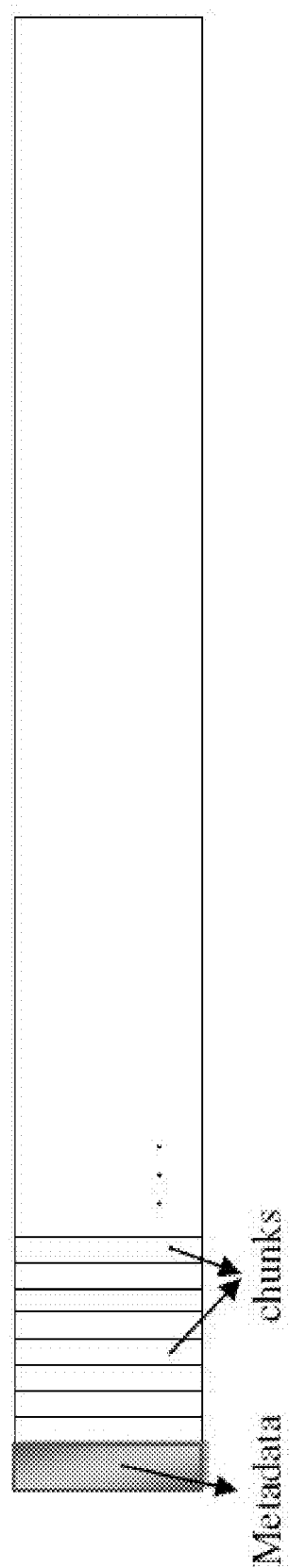
FIG. 10 illustrates storage of metadata in chunks in accordance with one embodiment of the present invention.

While a particular reference count mapping has been described, it will also be understood that other types of metadata could also be stored in one or more chunks, which is illustrated in FIG. 10. Thus, it would be understood that the previous descriptions of metadata are considered to be non-limiting examples and the reference count mapping and may be extended to include other types of information.

In one embodiment, metadata information is replicated and stored in individual storage units to increase resiliency against the failure of an individual storage unit containing metadata. The amount of redundant storage of metadata to achieve acceptable tolerance of the failure of an individual storage unit containing metadata can be based on the requirements of an individual application.

IV. Other Benefits of Reference Count Mapping

The reference count map of the present invention provides various benefits. Each chunk on a disk/pool has a reference count stored in a reference count map chunk. The chunks reference count appears in a sequential order as the chunks appear in the storage pool. The reference count is incremented and decremented as the volumes or snapshots are created and removed in the pool. The reference count map allows user to create unlimited snapshots. Additionally it simplifies the logic for reading and writing on the origin and the snapshot. It also combines new chunk allocation location, removing the new need to create a separate bitmap for a new chunk allocation. As an example, in one implementation, the origin radix root is cloned on snapshot creation. This permits, during an update write, a traversal of the nodes and an appropriate update of the usage count to support features such as ROW snapshots.

LIST OF ACRONYMS

ASIC: Application Specific Integrated Circuit
API: Application Programming Interface
ATA: Advanced Technology Attachment
BIO: Block I/O
CIFS: Common Internet File System
COW: Copy On Write
DMA: Direct Memory Access
FC: Fibre Channel
FCoE: Fibre Channel over Ethernet
FCP: Fibre Channel Protocol
FTP: File Transfer Protocol
HTML: Hyper Text Markup Language
HTTP: Hyper Text Transfer Protocol
I/O: Input/Output
IP: Internet Protocol
iSCSI: Internet Small Computer System Interface
NFS: Network File System
PCI: Peripheral Component Interconnect
POSIX: Portable Operating System Interface for uniX
RAID: Redundant Array of Independent Disks
RDMA: Remote Direct Memory Access
ROW: Redirect On Write
SATA: Serial ATA
SAS: Serial Attached SCSI
SCSI: Small Computer System Interface
SSD: Solid State Drive
SSL: Secure Sockets Layer
TCP: Transmission Control Protocol
XML: eXtensible Markup Language

What is claimed is:

1. A method for scalable indexing of a storage pool formed from multiple storage units in which backup information is recorded, comprising:
    forming a virtual volume in which the combined storage capacity of the storage pool is represented by a set of chunks have a pre-selected data size with the chunks being assigned to be either storage chunks or reference chunks;
    storing in a set of reference chunks metadata information to index the storage chunks and track usage of storage chunks, wherein storage chunks are allocated on demand and are referable more than once to reduce redundant storage for identical content;
    adjusting the total number of chunks and a chunk allocation in response to a change in the size of the available physical storage to include a sufficient number of reference chunks to index all of the storage chunks;
    wherein the reference chunks are updatable to store indexing information for redirect on write snapshots of the virtual volume; and
    wherein the set of reference chunks stores:
        a reference count map maintained as a set of contiguous storage pool chunks, the reference count map referencing all the storage chunks in a virtual volume including usage information on storage chunks used more than once including a usage count of each storage chunk, the usage count tracking free and allocated storage chunks and the number of times a storage chunk is referenced; and
        a reference count of chunks referred to by any redirect on write snapshots of the virtual volume.

2. The method of claim 1, wherein the reference chunks store a representation of a radix tree to index each storage chunk and the usage of each chunk.

3. The method of claim 1, wherein the set of reference chunks further stores:
    a reference count of chunks referred to by the virtual volume; and
    a reference count of chunks referred to by clones of the virtual volume.

4. The method of claim 1, wherein the set of contiguous storage pool chunks are disposed at one end of the storage pool or on an external storage device.

5. The method of claim 1, wherein the reference count map is cached for faster access.

6. The method of claim 1, wherein the reference count map provides index information for allocating a group of storage pool chunks which can be used by any number of virtual volumes.

7. The method of claim 1, further comprising maintaining a circular buffer of pre-allocated chunks and storing the circular buffer onto the persistent storage.

8. The method of claim 7, further comprising reading the circular buffer, the circular buffer saving the chunk allocations for each entry in the circular buffer when it was stored on persistent storage.

9. The method of claim 1, wherein the maximum amount of potential storage space allocated to users is greater than the physical storage capacity of the storage pool and storage space is allocated on demand based on actual usage.

10. A method for scalable indexing of a storage pool formed from multiple storage units in which backup information is recorded, comprising:
    forming a virtual volume in which the combined storage capacity of the storage pool is represented by a set of chunks have a pre-selected data size with the chunks being assigned to be either storage chunks or reference chunks;
    storing in a set of reference chunks metadata information to index the storage chunks and track usage of storage chunks, wherein storage chunks are allocated on demand and are referable more than once to reduce redundant storage for identical content; and
    adjusting the total number of chunks and a chunk allocation in response to a change in the size of the available physical storage to include a sufficient number of reference chunks to index all of the storage chunks, wherein the set of reference chunks stores a reference count map referencing all of the storage pool chunks in the storage pool, the reference chunks including a usage count of each storage chunk, the usage count tracking free and allocated storage chunks and wherein the reference count map assigns a set of bits in each reference chunk as a bitset to store a usage count of each storage chunk associated with a particular reference chunk to indicate when an individual storage chunk is allocated and referred to by more than one volume or snapshot.

11. The method of claim 10, wherein a usage count is maintained for each storage chunk, the method further comprising:
    incrementing the usage count of a chunk on snapshot creation;
    decrementing the usage count of a chunk on snapshot or virtual volume deletion; and
    decrementing the usage count of a shared chunk on update.

12. A method for scalable indexing of a storage pool formed from multiple storage units in which backup information is recorded, comprising:
- forming a virtual volume in which the combined storage capacity of the storage pool is represented by a set of chunks have a pre-selected data size with the chunks being assigned to be either storage chunks or reference chunks;
- storing in a set of reference chunks metadata information to index the storage chunks and track usage of storage chunks, wherein storage chunks are allocated on demand and are referable more than once to reduce redundant storage for identical content; and
- adjusting the total number of chunks and a chunk allocation in response to a change in the size of the available physical storage to include a sufficient number of reference chunks to index all of the storage chunks, wherein the set of reference chunks stores a reference count map referencing all of the storage pool chunks in the storage pool, the reference chunks including a usage count of each storage chunk, the usage count tracking free and allocated storage chunks and wherein each reference count chunk in the reference map indexes a set of storage chunks, the method further comprising:
  - in response to allocation of a chunk, scanning a reference count map bitset in a first reference count chunk to identify the address of a freely available chunk in the storage pool;
  - responsive to determining that the scanned reference count chunk does not have any free bitset available, sequentially scanning subsequent reference count chunks to identify the first freely available bitset and marking the bitset to identify a new chunk allocation.

13. A method for scalable indexing of a storage pool formed from multiple storage units in which backup information is recorded, comprising:
- forming a virtual volume in which the combined storage capacity of the storage pool is represented by a set of chunks have a pre-selected data size with the chunks being assigned to be either storage chunks or reference chunks;
- storing in a set of reference chunks metadata information to index the storage chunks and track usage of storage chunks, wherein storage chunks are allocated on demand and are referable more than once to reduce redundant storage for identical content;
- adjusting the total number of chunks and a chunk allocation in response to a change in the size of the available physical storage to include a sufficient number of reference chunks to index all of the storage chunks; and
- logging a reference count change in a logging string, comprising:
  - an address of a reference count chunk;
  - an offset of a storage pool chunk within a reference count chunk;
  - a previous reference count; and
  - a new reference count.

14. A method for scalable indexing of a storage pool formed from multiple storage units in which backup information is recorded, comprising:
- forming a virtual volume in which the combined storage capacity of the storage pool is represented by a set of chunks have a pre-selected data size with the chunks being assigned to be either storage chunks or reference chunks;
- storing in a set of reference chunks metadata information to index the storage chunks and track usage of storage chunks, wherein storage chunks are allocated on demand and are referable more than once to reduce redundant storage for identical content; and
- wherein the reference chunks having a sequential order and the reference chunks comprise a reference count map including:
  - a reference count of chunks referred to by the virtual volume;
  - a reference count of chunks referred to by clones of the virtual volume; and
  - a reference count of chunks referred to by any redirect on write snapshots of the virtual volume.

15. The method of claim 14, wherein the reference count map further comprises a usage count of chunks referred to more than once.

16. The method of claim 14, further comprising:
- adjusting the total number of chunks and a chunk allocation in response to a change in the size of the available physical storage to include a sufficient number of reference chunks to index all of the storage chunks.

17. A storage server to provide thin provisioning of storage, comprising:
- at least one interface for the storage server to access storage devices;
- at least one processor and a memory having computer program code which when executed on the processor is operative to perform scalable indexing of a storage pool formed from multiple storage units in which backup information is recorded, including:
  - generating a virtual volume in which the combined storage capacity of the storage pool is represented by a set of chunks have a pre-selected data size with the chunks being assigned to be either storage chunks or reference chunks;
  - storing in a set of reference chunks metadata information to index the storage chunks and track usage of storage chunks, wherein storage chunks are allocated on demand and are referable more than once to reduce redundant storage for identical content; and
  - adjusting the total number of chunks and a chunk allocation in response to a change in the size of the available physical storage to include a sufficient number of reference chunks to index all of the storage chunks;
  - wherein the set of reference chunks stores a reference count map referencing all of the storage pool chunks in the storage pool, the reference chunks including a usage count of each storage chunk, the usage count tracking free and allocated storage chunks; and
  - wherein the reference count map assigns a set of bits in each reference chunk as a bitset to store a usage count of each storage chunk associated with a particular reference chunk to indicate when an individual storage chunk is allocated and referred to by more than one volume or snapshot.

18. The storage server of claim 17, wherein the reference chunks store a representation of a radix tree to index each storage chunk and the usage of each chunk.

19. The storage server of claim 17, wherein the scalable indexing further comprises: updating reference chunks to store indexing information for redirect on write snapshots of the virtual volume.

20. The storage server of claim 17, wherein the set of reference chunks stores: a reference count map referencing all the storage chunks in a virtual volume including usage information on storage chunks used more than once.

21. The storage server of claim 17, wherein the set of reference chunks further stores:

a reference count of chunks referred to by the virtual volume;

a reference count of chunks referred to by clones of the virtual volume; and a reference count of chunks referred to by any redirect on write snapshots of the virtual volume.

22. The storage server of claim 17, wherein the storage server includes a set of interfaces for file based access and block based access of storage devices.

23. The storage server of claim 17, wherein the storage server is a Unified Storage Server (USS).

24. The storage server of claim 22, wherein the scalable indexing further comprises: updating reference chunks to store indexing information for redirect on write snapshots of the virtual volume.

25. The storage server of claim 24, wherein the set of reference chunks stores:

a reference count map referencing all the storage chunks in a virtual volume including usage information on storage chunks used more than once.

26. The storage server of claim 24, wherein the set of reference chunks further stores:

a reference count of chunks referred to by the virtual volume;

a reference count of chunks referred to by clones of the virtual volume; and a reference count of chunks referred to by any redirect on write snapshots of the virtual volume.

27. A storage server to provide thin provisioning of storage, comprising:

at least one interface for the storage server to access storage devices;

at least one processor and a memory having computer program code which when executed on the processor is operative to perform scalable indexing of a storage pool formed from multiple storage units in which backup information is recorded, including:

generating a virtual volume in which the combined storage capacity of the storage pool is represented by a set of chunks have a pre-selected data size with the chunks being assigned to be either storage chunks or reference chunks;

storing in a set of reference chunks metadata information to index the storage chunks and track usage of storage chunks, wherein storage chunks are allocated on demand and are referable more than once to reduce redundant storage for identical content; and adjusting the total number of chunks and a chunk allocation in response to a change in the size of the available physical storage to include a sufficient number of reference chunks to index all of the storage chunks;

wherein the set of reference chunks stores a reference count map referencing all of the storage pool chunks in the storage pool, the reference chunks including a usage count of each storage chunk, the usage count tracking free and allocated storage chunks and wherein each reference count chunk in the reference map indexes a set of storage chunks, the method further comprising:

in response to allocation of a chunk, scanning a reference count map bitset in a first reference count chunk to identify the address of a freely available chunk in the storage pool;

responsive to determining that the scanned reference count chunk does not have any free bitset available, sequentially scanning subsequent reference count chunks to identify the first freely available bitset and marking the bitset to identify a new chunk allocation.

28. A storage server to provide thin provisioning of storage, comprising:

at least one interface for the storage server to access storage devices;

at least one processor and a memory having computer program code which when executed on the processor is operative to perform scalable indexing of a storage pool formed from multiple storage units in which backup information is recorded, including:

generating a virtual volume in which the combined storage capacity of the storage pool is represented by a set of chunks have a pre-selected data size with the chunks being assigned to be either storage chunks or reference chunks;

storing in a set of reference chunks metadata information to index the storage chunks and track usage of storage chunks, wherein storage chunks are allocated on demand and are referable more than once to reduce redundant storage for identical content;

adjusting the total number of chunks and a chunk allocation in response to a change in the size of the available physical storage to include a sufficient number of reference chunks to index all of the storage chunks; and logging a reference count change in a logging string, comprising:

an address of a reference count chunk;

an offset of a storage pool chunk within a reference count chunk;

a previous reference count; and a new reference count.

29. A method for scalable indexing of a storage pool formed from multiple storage units in which backup information is recorded, comprising:

forming a virtual volume in which the combined storage capacity of the storage pool is represented by a set of chunks have a pre-selected data size with the chunks being assigned to be either storage chunks or reference chunks;

storing in a set of reference chunks metadata information to index the storage chunks and track usage of storage chunks, wherein storage chunks are allocated on demand and are referable more than once to reduce redundant storage for identical content;

adjusting the total number of chunks and a chunk allocation in response to a change in the size of the available physical storage to include a sufficient number of reference chunks to index all of the storage chunks;

wherein the set of reference chunks stores:

a reference count map maintained as a set of contiguous storage pool chunks disposed at one end of the storage pool or on an external storage device, the reference count map referencing all the storage chunks in a virtual volume including usage information on storage chunks used more than once including a usage count of each storage chunk.

30. The method of claim 29, wherein the reference chunks store a representation of a radix tree to index each storage chunk and the usage of each chunk.

31. The method of claim 29, wherein the reference chunks are updatable to store indexing information for redirect on write snapshots of the virtual volume.

32. The method of claim 29, wherein the reference count map includes a usage count of each storage chunk, the usage count tracking free and allocated storage chunks and the number of times a storage chunk is referenced.

33. The method of claim 29, wherein the reference count map includes a reference count of chunks referred to by any redirect on write snapshots of the virtual volume.

34. A method for scalable indexing of a storage pool formed from multiple storage units in which backup information is recorded, comprising:

forming a virtual volume in which the combined storage capacity of the storage pool is represented by a set of chunks have a pre-selected data size with the chunks being assigned to be either storage chunks or reference chunks;

storing in a set of reference chunks metadata information to index the storage chunks and track usage of storage chunks, wherein storage chunks are allocated on demand and are referable more than once to reduce redundant storage for identical content;

adjusting the total number of chunks and a chunk allocation in response to a change in the size of the available physical storage to include a sufficient number of reference chunks to index all of the storage chunks;

wherein the reference chunks having a sequential order and the reference chunks comprise a reference count map referencing all of the storage pool chunks in the storage pool, the reference chunks including a usage count of each storage chunk, the usage count tracking free and allocated storage chunks.

* * * * *